Feb. 25, 1964     F. A. PHILBIN     3,121,956
AREA MEASURING MEANS
Filed Aug. 3, 1960     2 Sheets-Sheet 2
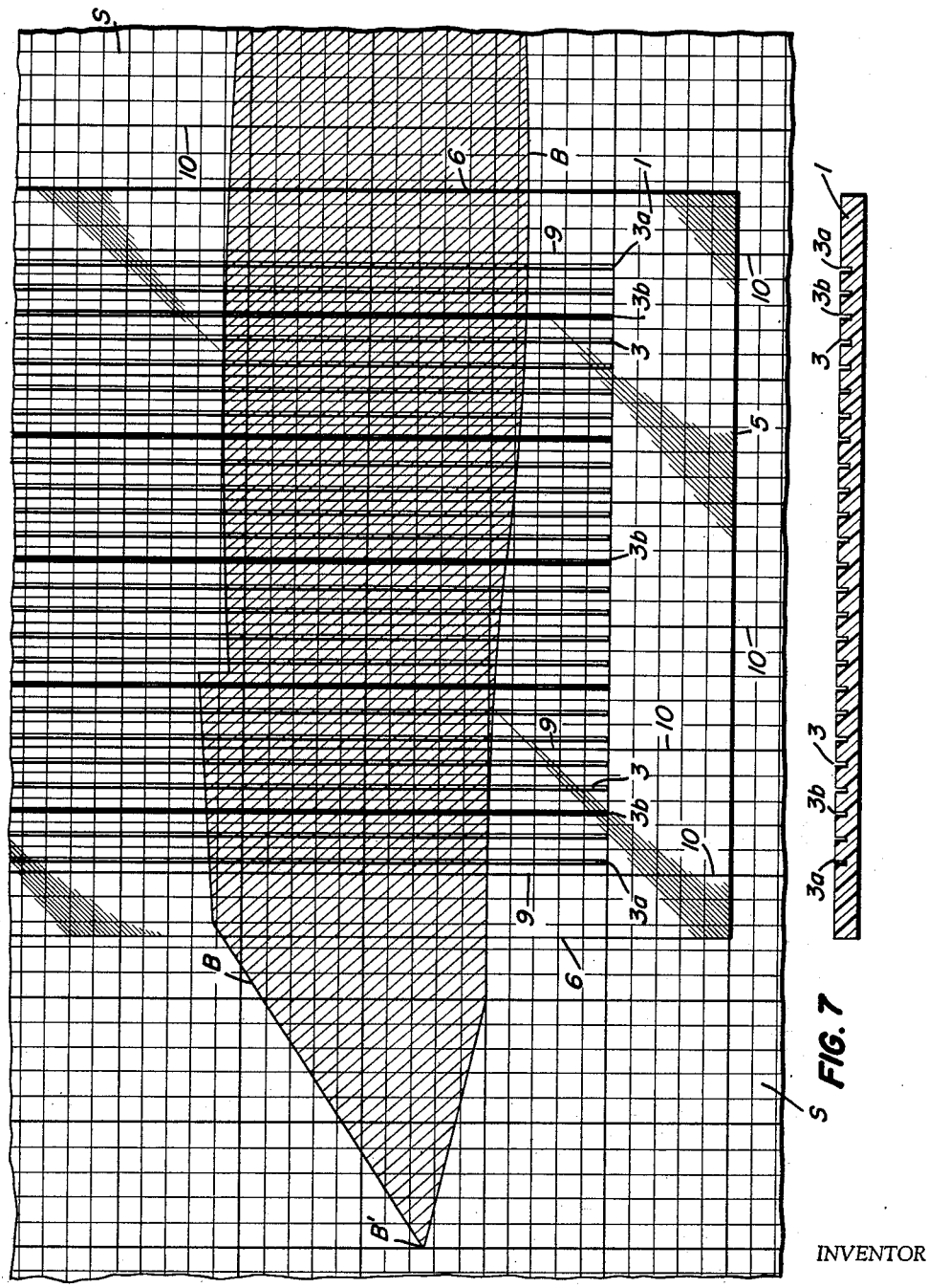
INVENTOR
Frank A. Philbin
BY
ATTORNEY United States Patent Office 3,121,956
Patented Feb. 25, 1964

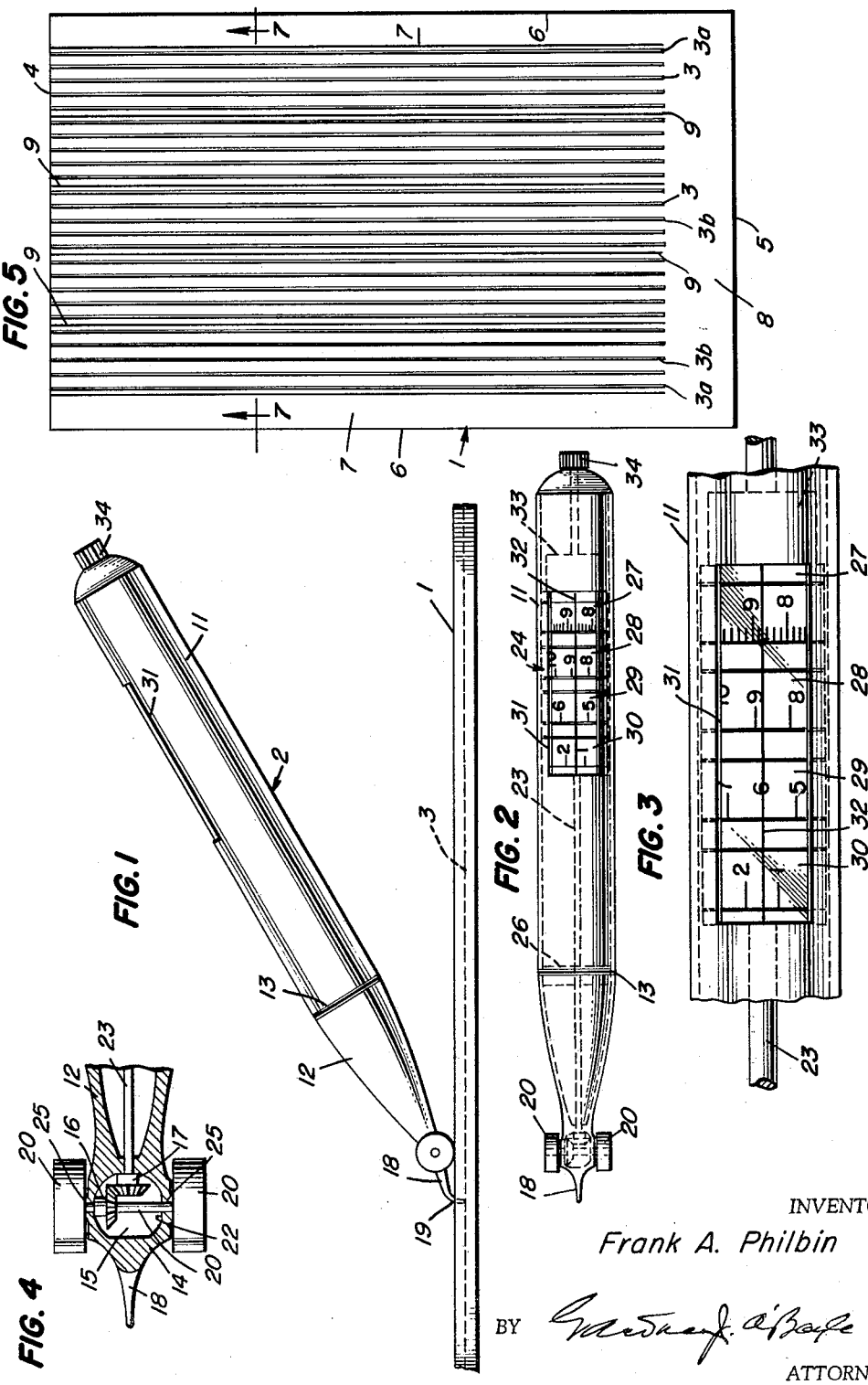

3,121,956
AREA MEASURING MEANS
Frank A. Philbin, 177 Cemetery St., Archbald, Pa.
Filed Aug. 3, 1960, Ser. No. 47,181
4 Claims. (Cl. 33—121)

This invention relates to area measuring means, and more particularly, to improved means for determining areas of highway construction cross-sections, maps or other drawings of surfaces having irregular boundaries.

The generally accepted methods of determining the area of a surface having an irregular boundary are by mechanical computation, measurement with a planimeter, or with a plastic strip.

The mathematical computation method involves division of the area into segments, calculating the area of each segment, and totaling the areas thus derived. While the results obtained by this method are substantially accurate, the procedure is time consuming, and impracticable when employed in the processing of a large volume of area determinations.

Measurement with a planimeter provides results within allowable error, provided that the instrument is skillfully operated. The recommended procedure in connection with the use of the planimeter involves certain preliminary precise adjustments of the instrument, triple running of the area, and averaging the results of the separate readings. Additionally, the instrument requires special settings for use with particular scales, frequent repositioning to encompass large areas, and extreme care in maintaining the tracer arm in such position as to prevent binding, with consequent diminution of accuracy. Since a planimeter embodies wheel or roller members which traverse the surface to be measured, any distortion of the surface will have an adverse effect on the accuracy of the results obtained.

In accordance with the plastic strip method a narrow grooved strip of plastic is placed over the cross-section paper and moved from unit block to unit block, using a pointer to mark off the strip and distance traversed, until the measured area is 100 sq. ft.; this reading is then noted and the operation is repeated until the entire area is determined. While this method is comparatively rapid and requires but little skill on the part of the operator, the monotony of the operation frequently induces errors, due to inattention, and consequently, constant checking of the results is required.

The present invention is directed to improved means for determining areas of surfaces having irregular boundaries, which means are characterized by simplicity of construction, accuracy, and ease and rapidity of operation with a modicum of operative skill. The improved area measuring means comprises, essentially, an area measuring and recording device, and a grooved transparent plastic plate adapted for emplacement on a scaled cross-section of the area which is to be determined. The area measuring and recording device is constructed and arranged to be manually traversed on the plate and guided by the grooves therein, and during such traverse, the area measuring and recording mechanism is actuated by means of roller elements carried by the device, adapted for frictional driving engagement with the surface of the plate.

An object of the invention is to provide improved means for determining areas of surfaces having irregular boundaries.

Another object of the invention is to provide improved means for measuring and recording areas of highway construction cross-sections.

Yet another object of the invention is to provide improved means for measuring and recording areas of surfaces having irregular boundaries, which means is intrinsically accurate and requires no special operative skill.

Still another object of the invention is to provide improved means for measuring and recording areas of surfaces having irregular boundaries, which means are characterized by simplicity of construction, and ease and rapidity of operation.

With these and other objects in view, which may be incident to my improvements, the invention consists in the parts and combinations to be hereinafter set forth and claimed, with the understanding that the several necessary elements, comprising my invention, may be varied in construction and arrangement, without departing from the spirit and scope of the appended claims.

In the drawings:

FIGURE 1 is a perspective view of the area measuring and recording device operatively associated with a transparent plate;

FIG. 2 is a plan view of the area measuring and recording device of FIG. 1;

FIG. 3 is an enlarged detail view of the recorder dials shown in FIG. 2;

FIG. 4 is an enlarged detail view of the recorder driving mechanism;

FIG. 5 is a top plan view of the plate of FIG. 1;

FIG. 6 is a plan view showing the plate in operative position on a scaled drawing; and FIG. 7 is a sectional view on line 7—7 of FIG. 5.

Referring to the drawings, and more particularly to FIGS. 1, 2 and 5, the improved area measuring means comprises a lined and grooved transparent plate 1, adapted to be superimposed in selected registry on a scaled drawing, and an area measuring and recording device 2, adapted for manual movement on the plate. The plate is formed with a series of parallel grooves 3 of equal length, extending from one edge 4 to a distance of about one inch from the opposite edge 5, the outermost grooves 3a being spaced about one-half inch from the adjacent side edges 6 of the plate, to provide unmarked or ungrooved flat areas or ledges 7, to permit the operator to position the plate on the drawing, and to apply digital pressure; an unmarked or unscribed section 8 provides a runoff area for the area measuring device 2. The upper surface of the plate is imprinted or otherwise provided with a series of black or other distinctly colored parallel lines 9 spaced exactly one inch apart for matching and registering with the heavy vertical lines 10 (FIG. 6) of standard cross-section paper. The grooves 3 are equispaced and, as shown, five of the grooves lie within each adjacent series of parallel registering lines 9. The grooves are cut to substantial depth, about half the thickness of the plastic sheet or plate for accurately guiding the area measuring device in its traverse on the plate, and the central groove 3b, between adjacent parallel lines 9, is preferably distinctly colored, as by red coloration, for a purpose to be described more fully hereinafter. The plate may be formed from any suitable clear, transparent plastic sheet material of good thermal stability, and of such size as to be conveniently handled, for example, approximately 10" long, 6" wide, and 3/16" thick.

The area measuring device 2, as prviously noted, is an automatic recording instrument actuated by its traverse over the plastic plate. This unit comprises, essentially, a hollow cylindrical shaped casing 11, having a conical shaped portion 12, detachably secured to the casing as at 13, and terminating in an enlargement 14 formed with a chamber 15 adapted to accommodate gears 16 and 17 of the recorder driving mechanism. The enlargement 14 is provided with a forwardly projecting guide member 18, having a tapered and downwardly curved end portion 19 adapted for sliding guidance engagement with the grooves 3 of the plate. The recorder driving mechanism embodies wheels or rollers 20 secured to an axle 21 journalled in the side walls 22 of the chamber 15, and a recorder drive shaft 23 operatively connected to the dials of a recording unit 24 mounted within the housing or casing 11. The aligned apertures 25, in the walls of the chamber 15, which support the axle 21, may be fitted with anti-friction bearings, such as bushings of nylon or oil-impregnated porous metal. The bevel gear 16 is secured to the axle 21 and meshes with the gear 17 keyed or otherwise secured to the recorder drive shaft 23, which is rotatably supported by means of a spider bearing support 26 mounted in and secured to the inner wall of the casing. The wheels or rollers 20 are formed with a relatively wide tread or traction surface of the order of 1/8", a circumference of exactly 1", and are preferably spaced 1/2", center to center, on the axle. The treads of the traction wheels are desirably milled, buffed or etched to provide a roughened surface to increase their frictional engagement with the plate.

The recording unit 24 comprises a series of four dials 27, 28, 29 and 30, viewable through a window 31 mounted in the casing and overlying the dials, which window may be formed with an optical magnification curvature to facilitate reading of the dials. The window is provided with a central longitudinal etched or scribed red colored line 32, forming a datum line which corresponds in position with the zero reading of each dial, and serves as a clear line of demarcation for reading the dials after a given operation of the recorder. The lowest rated dial 27 is directly connected to the shaft 23, the progressively higher rated dials 28, 29 and 30 are loosely mounted on the shaft and so interconnected by suitable gearing or tripping mechanism as to be progressively coupled to and driven a partial revolution by a precedent dial after such precedent dial has completed one revolution. The dials are provided with graduations in terms of square feet of the area measured, and are geared to operate in sequence so that one complete revolution of a lower rated dial will produce one tenth of a revolution of the next higher rated dial. Thus, dial 27 reads from 0 to 10 sq. ft.; dial 28 from 0 to 100 sq. ft.; dial 29 from 0 to 1,000 sq. ft.; and dial 30 from 0 to 10,000 sq. ft. A suitable reset mechanism, designated generally by numeral 33, operated by means of a knob 34 is provided to return the dials to their initial zero positions.

In order that the dials will correctly record the linear distance traversed by the traction wheels, a certain gear ratio must be maintained between the gears 16 and 17 of the recorder driving mechanism. As previously noted, the circumference of each traction wheel is 1", and in one revolution the wheels travel a linear distance of 1", which distance is equal to 5 sq. ft. when the scale of the cross-section is $1''=5$ sq. ft. Since one revolution of the lowest rated dial 27 records 10 sq. ft. of measured area, the gear ratio should be 2 to 1, in order that two complete revolutions of the axle 21 will revolve the recorder drive shaft 23 once.

As indicated hereinbefore, the area measuring means of the present invention are primarily adapted for use in connection with the determination of highway cross-section areas, and as these areas are generally plotted to a $1''=5'$ scale, the recorder is designed to provide direct readings when used with that scale. Since there is a fixed ratio between any two different scales, and also between the areas enclosed on scaled drawings, this ratio may be used as a conversion factor to convert the recorded reading when the cross-section areas are plotted to a scale other than $1''=5'$. By way of illustration, if the scale of the drawing is $1''=1'$, $1''=5'$ or $1''=10'$, the area enclosed by 1 sq. in. is respectively, 1 sq. ft., 25 sq. ft. and 100 sq. ft. Accordingly, if the device is used with a $1''=1'$ scale the recorded reading would be multiplied by $1/25$, and when used with a $1''=10'$ scale the reading would be multiplied by 4. In like manner, if the device is used with any other scale, the ratio between that scale and the conventional scale of $1''=5'$ can be predetermined and used as a conversion factor to obtain a measured area in accordance with the conventional scale.

When it is desired to measure the area within a specific perimeter of a scaled drawing, as for example, the cross-hatched area within the irregular boundary B, (FIG. 6) the plate 1 is placed over the sheet of cross-section paper S in a position to encompass a portion of the area to be measured, such as that portion shown at the left side of the drawing. The plate is enplaced so that its upper edge 4 is superimposed over the highest point of the boundary B, with the black lines 9 of the plate registering with heavy vertical lines 10 of the cross-section paper, and with the outermost groove 3a of the plate overlying the apex or margin B' of the boundary. After the plate has been properly positioned on the scaled drawing, it may be held in position by application of digital pressure on ledged area 6, or if desired, by means of a paper weight. As will be appreciated, the application of pressure on the plate serves to flatten the subjacent surface of the cross-section paper, thus smoothing out any rippled areas in the paper, which otherwise might introduce errors in measurements. Since downward movement of the area measuring instrument relative to the plate is the most practical method of operation, the operator places the guide member 18 of the instrument in the groove 3a at a point directly above the topmost line of the area, and then moves the instrument downwardly of the groove until the guide 18 coincides with the lower line of the area. The device is then moved to the next adjacent groove to the right, and the procedure is repeated successively until the entire area within the confines of the grooved portion of the plate has been run. If the area to be measured extends beyond the grooved portion of the plate in its original position, a pencil reference mark is made on the drawing at the limiting point, and the plate is moved to a new position constituting a prolongation of its previous position, extending from the reference mark, and the measuring procedure, as above described, is repeated. After the entire area within the boundary B has been run, the result may be directly read on the dials of the recorder.

In order to provide a rapid approximate method of area determination, or to check previously run areas, a special procedure may be utilized. With this procedure, the plate is accurately positioned on the scaled drawing in the manner previously described, and the instrument is traversed only in the grooves 3b of the plate, rather than in each groove thereof. After the entire area has been run, the operator notes the total reading on the recorder and multiplies this total by 5, when working with a $1''=5'$ scale. If a closer approximation is desired, any additional narrow area extending beyond the limit of a groove 3b may be run in the normal manner, i.e., by traversing the instrument in each groove 3 over the narrow area, then adding the area so obtained to the previous calculated result.

It will be appreciated that the design and construction of the area measuring and recording device, and the correlated design of the functionally cooperating transparent guide plate insure facile, substantially fool-proof operation and optimum accuracy of area determination. The broad tread of the traction wheels and their relatively wide spacing insures complete lateral stability of the device in its traverse over the plate. The utilization of a guide member engaging the relatively deep grooves, insures an undeviating, unidirectional movement of the instrument over a preselected distance and in precise coincidence with the established scale lines of the drawing, to thereby obtain accurate readings without any special operative skill.

I claim:

1. Improved means for determining areas of highway cross-sections, comprising a transparent plate having parallel lines thereon and a series of equi-spaced grooves between the lines, each groove having a depth substantially equal to one-half the thickness of the plate, said plate being superimposed on, and in selected registry with a scaled cross-section drawing of the area to be measured with the parallel lines of the plate matching and registering with corresponding parallel lines on the scaled drawing; a unitary, automatic area measuring and recording device adapted to be manually traversed unidirectionally of the grooves in the plate, said device comprising a casing, an area recording mechanism mounted within the casing, drive means to actuate the recording mechanism, including a pair of spaced roller elements carried by the casing, adapted for frictional rolling engagement with the surface of the plate during traverse thereof by the area measuring and recording device, transmission means interconnecting the roller elements and the area recording mechanism the diameter of each of the roller elements and the spacing between each of the grooves bearing a preselected relationship to the scale employed in the cross-section drawing of the area to be measured, and a guide member fixedly mounted on the casing centrally of the roller elements, and extending forwardly and downwardly thereof, said guide member being constructed and arranged for sliding guidance engagement with the grooves of the plate to guide the area measuring device during its unidirectional traverse of the plate.

2. Improved means for determining areas of highway cross-sections in accordance with claim 1, in which the transparent plate includes an ungrooved portion adjacent each side and one end thereof said ungrooved side portions permitting the operator to position the plate on the drawing and to apply digital pressure, said ungrooved end portion providing a runoff area for the measuring device.

3. Improved means for determining areas of highway cross-sections in accordance with claim 1, in which the central groove of each of the series of grooves between the parallel lines is distinctively colored, whereby the approximate area of the highway cross-section can be rapidly determined by traversing the measuring and recording device along said central groove and multiplying the total recorded on the device by the number of grooves between the parallel lines of the plates.

4. Improved means for determining areas of highway cross-sections in accordance with claim 1, in which the area recording mechanism drive means comprises a pair of wheels secured to an axle journalled in the casing, said transmission means, including a drive shaft and gears, interconnecting the axle and the drive shaft.

References Cited in the file of this patent

UNITED STATES PATENTS

| | | |
|---|---|---|
| 60,506 | Guerrant et al. | Dec. 18, 1866 |
| 1,560,392 | Mager | Nov. 3, 1925 |

FOREIGN PATENTS

| | | |
|---|---|---|
| 411,543 | France | Apr. 13, 1910 |